United States Patent [19]
Kano et al.

[11] 3,907,542
[45] Sept. 23, 1975

[54] METHOD OF STIMULATING PARTHENOCARPY IN PLANTS

[75] Inventors: Hideo Kano, Ibaraki; Masaru Ogata, Kobe; Hisajiro Yukinaga, Kusatsu, all of Japan

[73] Assignee: Shionogi & Company,, Japan

[22] Filed: Jan. 23, 1974

[21] Appl. No.: 435,968

Related U.S. Application Data

[62] Division of Ser. No. 237,970, March 24, 1972, abandoned.

[30] Foreign Application Priority Data

Mar. 31, 1971 Japan.............................. 46-19411
Mar. 31, 1971 Japan.............................. 46-19412

[52] U.S. Cl. ..................... 71/88; 71/67; 71/94; 260/296 H; 260/296 T; 260/307 D
[51] Int. Cl.² ........................................ A01N 9/00
[58] Field of Search ....................................... 71/88

[56] References Cited
UNITED STATES PATENTS 2,776,977  1/1957  D'Amico............................ 71/88
3,381,016  4/1968  Marklillie........................... 71/88
3,547,940  12/1970  Brantley............................ 71/88
3,578,673  5/1971  Bruson et al....................... 71/88

OTHER PUBLICATIONS

Bianchi et al., "Convenient Synthesis of Indoxazenes" (1966) CA 65 pp. 7160–7161, (1966).

Quihco et al., "Ricerche Sugli Osidi Di Nitrile" (1950) Gazz. Chim. Ital. 80 pp. 140–150 (1950).

Morrocchi et al. I, "Reazine Dei P-Chinoni Con etc.," (1968), Gazz. chim. ital. 98, pp. 891–906 (1968).

Morrocchi et al. II, "Studio Delle Strutture Chivoniche etc.," (1969) Gazz. Chim. Ital. 99 pp. 565–581 (1969).

Primary Examiner—Glennon H. Hollrah
Attorney, Agent, or Firm—Wenderoth, Lind & Ponack

[57] ABSTRACT

Plant growth regulating compositions which comprise quinone derivatives having isoxazole ring as active ingredients.

12 Claims, No Drawings

METHOD OF STIMULATING PARTHENOCARPY IN PLANTS

This is a division of application Ser. No. 237,970, filed Mar. 24, 1972, now abandoned.

The present invention relates to plant growth regulating compositions containing quinone derivatives as active ingredients. Further, it relates to a method of using the said compositions to modify plant growth.

The quinone derivatives contained in the said compositions may be represented by the following formula [I] or [II]:

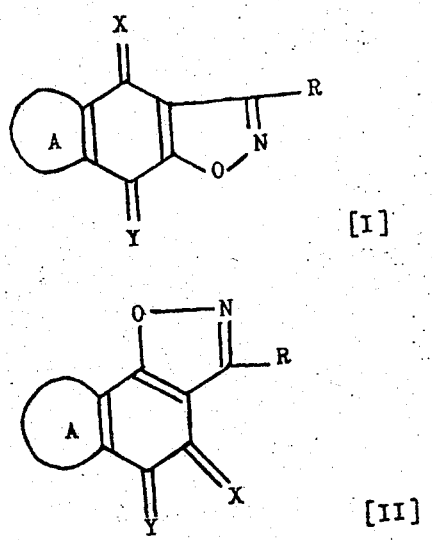

wherein R is a halogen atom (e.g. chlorine, bromine, iodine, fluorine), a lower alkyl group (e.g. methyl, ethyl, propyl, isopropyl, butyl, pentyl), a phenyl group or a pyridyl group; A is a condensed benzene ring or a condensed pyridine ring; X and Y each is an oxygen atom or the group of

and where A and R may have one or more substituents selected from the group consisting of hydroxy group, lower alkyl groups (e.g. methyl, ethyl, propyl, isopropyl, butyl, pentyl), lower alkoxy groups (e.g. methoxy, ethoxy, propoxy, butoxy), primary, secondary or tertiary lower alkyl amino groups (e.g. amino, methylamino, ethylamino, propylamino, dimethylamino, diethylamino) and halogen atoms (e.g. chloride, bromide, iodine, fluorine).

It has been discovered that the said quinone derivatives of the formula [I] or [II] have plant growth regulating activity.

Accordingly, a basic object of this invention is to provide novel plant growth regulating compositions containing an effective amount of one or more quinone derivatives of the formula [I] or [II] in combination with suitable agricultural carriers and other ingredients. A further object of the invention is to provide novel quinone derivatives having plant growth regulating activity. A still further object of the invention is to provide a method to modify or regulate the growth pattern of plants by application of the said compositions. These and other objects and the manner in which they are accomplished will become apparent to those conversant with the art from the following descriptions.

The quinone derivatives [I] or [II] contained in the composition of the invention can be prepared by condensing 1,4- or 1,2-quinone compounds [III] or [IV] with a suitable nitrile oxide according to the methods substantially described in Gazz. Chim. Ital. 80, 140 (1950), Gazz. Chim. Ital. 98, 891 (1968) and Gazz. Chim. Ital. 99, 565 (1969), as illustrated in the following equations.

A. Preparation of quinone derivatives [I]

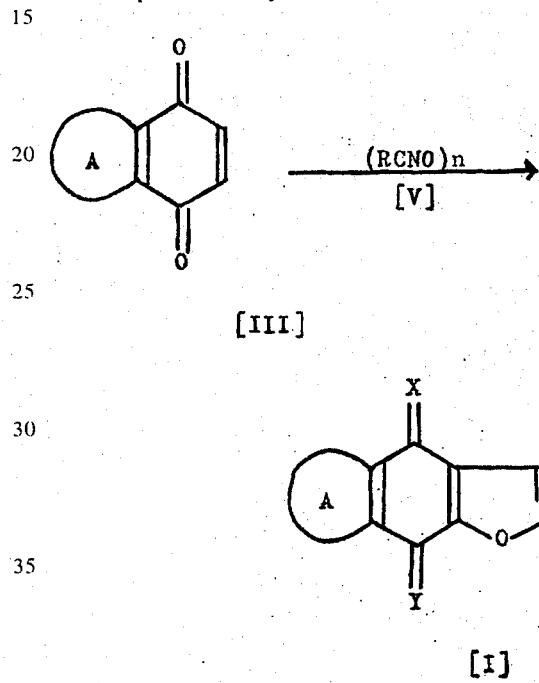

B. Preparation of quinone derivatives [II]

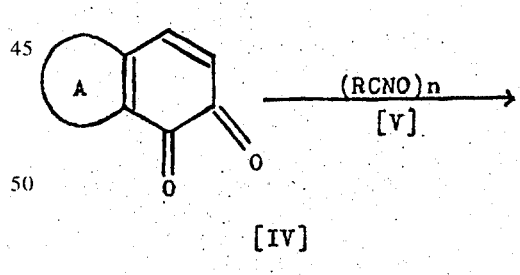

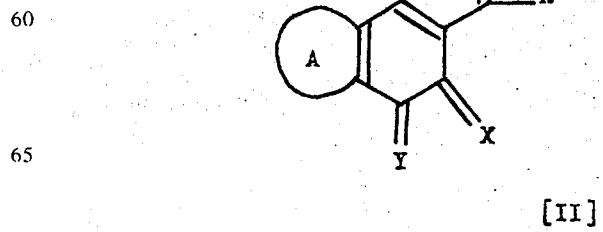

wherein R, A, X and Y each has the same significance as designated above and n is an integer 1 to 3.

More particularly, the reaction may be carried out by condensing 1,4-quinone compounds [III] or 1,2-quinone compounds [IV] with a nitrile oxide [V] in a suitable solvent under heating. As illustrated above, the quinone compounds [III] or [IV] may be made to react with one to three moles of the nitrile oxide [V] according to the object, i.e. which product is intended to be produced. Generally, the reaction is executed at a temperature ranging from about 10° to about 80°C for about 1 to about 3 hours under ordinary (atmospheric) pressure, while the reaction conditions may be varied depending on the properties of starting compounds [III] or [IV] and the nitrile oxide [V]. The reaction solvent may be selected from, for example, alcohols (e.g. methanol, ethanol), halogenoalkanes (e.g. chloroform, tetrachloromethane), ethers (e.g. ether, dioxane, tetrahydrofuran), aromatic hydrocarbons (e.g. benzene, toluene, xylene), and the like in consideration of the solubility of the starting compounds as well as other reaction conditions employed.

The nitrile oxide [V] can be prepared from the corresponding aldehyde oxime. The aldehyde oxime is first halogenated to give hydroxamyl halogenide and the hydroxamyl halogenide is subjected to dehydrohalogenation with a basic substance to give the desired nitrile oxide. The reaction for preparing the nitrile oxide may be illustrated as follow:

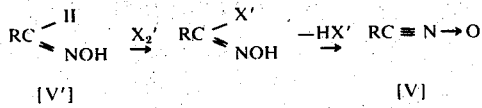

[V']  [V]

wherein X' represents a halogen atom and R has the same significance as designated above.

The basic substance may be selected from, for example, alkali metal hydroxides, alkali metal carbonates, alkali metal alkoxides, alkali metal salts of organic or inorganic acid, ammonia, primary, secondary and tertiary amines and the like. Thus prepared nitrile oxide [V] is very unstable. Therefore, it is preferred to use the nitrile oxide [V] prepared just before the condensation reaction and without isolation from the reaction mixture in which the nitrile oxide is prepared. Further, if it is intended to produce a product [I] or [II] in which X and Y each is an oxygen atom, it may be recommended to carry out the reaction in the presence of an oxidizing agent (e.g. hydrogen peroxide, chloranile, lead tetraacetate, mercury (II) acetate). hydrogen Examples of the quinone derivative [I] or [II] are:
3-chloro-4,9-dihydronaphtho[2,3-d]isoxazole-4,9-dione,
3,6-dibromo-4,9-dihydronaphtho[2,3-d]isoxazole-4,9-dione,
3-methyl-4,9-dihydronaphtho[2,3-d]isoxazole-4,9-dione,
3-ethyl-8-hydroxy-4,9-dihydronaphtho[2,3-d]isoxazole-4,9-dione,
3-propyl-6,7-dichloro-4,9-dihydronaphto[2,3-d]isoxazole-4,9-dione,
3-(4-methylphenyl)-4,9-dihydronaphtho[2,3-d]isoxazole-4,9-dione, 3-(2-chloro-4-dimethylaminophenyl)-4,9-dihydronaphtho[2,3-d]isoxazole-4,9-dione,
3-phenyl-4,9-dihydronaphtho[2,3-d]isoxazole-4,9-dione,
3-phenyl-6,7-dimethoxy-4,9-dihydronaphtho[2,3-d]isoxazole-4,9-dione,
3-(4-chlorophenyl)-6,7-dimethyl-4,9-dihydronaphtho[2,3-d]isoxazole-4,9-dione,
3-(4-chlorophenyl)-4,9-dihydronaphtho[2,3-d]isoxazole-4,9-dione,
3-(2,4-dichlorophenyl)-6,7-dimethyl-4,9-dihydronaphtho[2,3-d]isoxazole-4,9-dione,
3-(4-methoxyphenyl)-4,9-dihydronaphtho[2,3-d]isoxazole-4,9-dione,
3-(3-pyridyl)-4,9-dihydronaphtho[2,3-d]isoxazole-4,9-dione,
3-(4-methylphenyl)-6,7-dimethyl-4,9-dihydronaphtho[2,3-d]isoxazole-4,9-dione,
3-phenyl-4,9-dihydroisoxazolo[4,5-g]quinoline-4,9-dione,
3-(3-pyridyl)-4,9-dihydroisoxazolo[5,4-g]quinoline-4,9-dione,
3-methyl-4,9-dihydroisoxazolo[5,4-g]quinoline-4,9-dione,
3-phenyl-4,9-dihydroisoxazolo[4,5-g]isoquinoline-4,9-dione,
3,5'-diiodo-4-oxo-4,9-dihydronaphtho[2,3-d]isoxazole-9-spiro-2'-1',3',4'-dioxazole,
3,5'-dimethyl-4-oxo-4,9-dihydronaphtho[2,3-d]isoxazole-9-spiro-2'-1',3',4'-dioxazole,
3,5'-dibutyl-4-oxo-4,9-dihydronaphtho[2,3-d]isoxazole-9-spiro-2'-1',3',4'-dioxazole,
3,5'-diphenyl-4-oxo-4,9-dihydronaphtho[2,3-d]isoxazole-9-spiro-2'-1',3',4'-dioxazole,
3,5'-di-(3,5-dibromophenyl)-4-oxo-4,9-dihydronaphtho[2,3-d]isoxazole-9-spiro-2'-1',3',4'-dioxazole,
3,5'-di(3-methylphenyl)-4-oxo-6,7-difluoro-4,9-dihydronaphtho[2,3-d]isoxazole-9-spiro-2'-1',3',4'-dioxazole,
3,5'-di-(4-ethoxyphenyl)-4-oxo-5-hydroxy-4,9-dihydronaphtho[2,3-d]isoxazole-9-spiro-2'-1',3',4'-dioxazole,
3,5'-di-(3-pyridyl)-4-oxo-4,9-dihydronaphtho[2,3-d]isoxazole-9-spiro-2'-1',3',4'-dioxazole,
3,5'-diphenyl-4-oxo-4,9-dihydroisoxazolo[4,5-g]quinoline-9-spiro-2'-1',3',4'-dioxazole,
3,5'-dibromo-4-oxo-4,9-dihydroisoxazolo[4,5-g]quinoline-9-spiro-2'-1',3',4'-dioxazole,
3,5'-di-(3-pyridyl)-4-oxo-4,9-dihydroisoxazolo[5,4-g]quinoline-9-spiro-2'-1',3',4'-dioxazole,
3,5'-dichloro-4-oxo-4,9-dihydroisoxazolo[5,4-g]quinoline-9-spiro-2'-1',3',4'-dioxazole,
3,5'-dimethyl-4-oxo-4,9-dihydroisoxazolo[5,4-g]isoquinoline-9-spiro-2'-1',3',4'-dioxaole,
3-chloro-4,5-dihydronaphtho[2,1-d]isoxazole-4,5-dione,
3-methyl-4,5-dihydronaphtho[2,1-d]isoxazole-4,5-dione,
38-hydroxy-4,5-dihydronaphtho[2,1-d]isoxazole-4,5-dione,
3-phenyl-7-chloro-4,5-dihydronaphtho[2,1-d]isoxazole-4,5-dione,
3-(3-iodophenyl)-4,5-dihydronaphtho[2,1-d]isoxazole-4,5-dione,
3-(4-methylphenyl)-4,5-dihydronaphtho[2,1-d]isoxazole-4,5-dione,
3-(3-pyridyl)-4,5-dihydronaphtho[2,1-d]isoxazole-4,5-dione, 3-methyl-4,5-dihydroisoxazolo[5,4-f]quinoline--dione,
3-phenyl-4,5-dihydroisoxazolo[5,4-f]quinoline-4,5-dione,
3-(3-pyridyl)-8-methyl-4,5-dihydroisoxazolo[4,5-h]quinoline-4,5-dione,
3-phenyl-4,5-dihydroisoxazolo[4,5-h]isoquinoline-4,5-dione,
3,5'-diiodo-4-oxo-4,5-dihydronaphtho[2,1-d]isoxazole-5-spiro-2'-1',3',4'-dioxazole,
3,5',7,8,-tetramethyl-4-oxo-4,5-dihydronaphtho[2,1-d]isoxazole-5-spiro-2'-1',3',4'-dioxazole,
3,5'-diethyl-4-oxo-6-bromo-4,5-dihydronaphtho[2,1-d]isoxazole-5-spiro-2'-1',3',4'-dioxazole,
3,5'-dibutyl-4-oxo-4,5-dihydronaphtho[2,1-d]isoxazole-5-spiro-2'-1',3',4'-dioxazole,
3,5'-diphenyl-4-oxo-4,5-dihydronaphtho[2,1-d]isoxazole-5-sprio-2'-1',3',4'-dioxazole,
3,5'-di-(3,5-dichlorophenyl)-4-oxo-9-methyl-4,5dihydronaphtho[2,1-d]isoxazole-5-spiro-2'-1',3',4'-dioxazole,
3,5'-di-(4-methoxyphenyl)-4-oxo-4,5-dihydronaphtho[2,1-d]isoxazole-5-spiro-2'-1',3',4'-dioxazole,
3,5'-di-(3-pyridyl)-4-oxo-7,8-dichloro-4,5-dihydronaphtho[2,1-d]isoxazole-5-spiro-2'-1',3',4'-dioxazole,
3,5'-diphenyl-4-oxo-9-iodo-4,5-dihydroisoxazolo[5,4-f]quinoline-5-spiro-2'-1',3',4'-dioxazole,
3,5'-di-(3-pyridyl)-4-oxo-9-bromo-4,5-dihydroisoxazolo[5,4-f]quinoline-5-spiro-2'-1',3',4'-dioxazole,
3,5'-dimethyl-4-oxo-4,5-dihydroisoxazolo[4,5-h]quinoline-5-spiro-2'-1',3',4'-dioxaole,
3,5'-dibromo-4-oxo-4,5-dihydroisoxazolo[4,5-h]quinoline-5-spiro-2'-1',3',4'-dioxazole, and
3,5'-diphenyl-4-oxo-4,5-dihydroisoxazolo[5,4-f]isoquinoline-5-spiro-2'-1',3',4'-dioxazole.

The quinone derivatives of the formula [I] or [II] are useful for control of plant growth. For example, the quinone derivatives [I] and [II] show herbicidal and algicidal activities against a variety of weeds and algae including, for example, *Monochoria vaginalis*, *Rotala indica*, *Vandellia anugstifolia*, *Cyperus difformis*, *Spirogyra arcla* and *Oedogonium sp.*, when applied at a level of about 10 grams per are to about 80 grams per are, but are inactive to gramineous plants even at the same or slightly higher level. Therefore, they can be used at this level as a selective herbicide or algicide. Although the quinone derivatives [I] and [II] have these and other growth regulating activities as a plant hormone, the most important and characteristic feature they show is parthenocarpy-stimulating activity.

As is well known, parthenocarpy-stimulating agents are important in cultivation of fruits in the green house. It has been discovered that the quinone derivatives [I] and [II] have excellent parthenocarpy-stimulating activity against various fruits such as tomato, eggplant, cucumber, melon, water melon and the like. To illustrate the parthenocarpy-stimulating effect, the test results with tomato are shown in the following table.

Parthenocarpy-stimulating Effects of Some Typical Quinone Derivatives [I] and [II]

| Test Compound | Test Variety of Tomato | Concentration (μg/ml) | Number of Flowers Treated | Number of Fruit Developed | Percentage of Parthenocarpy Stimulated |
|---|---|---|---|---|---|
| 3-Phenyl-4,9-dihydronaphtho-[2,3-d]isoxazole-4,9-dione | "Miniature" | 50 | 32 | 10 | 31.3 |
| '' | '' | 100 | 34 | 12 | 35.3 |
| '' | '' | 250 | 34 | 6 | 17.6 |
| '' | "Fukuju No. 2" | 250 | 9 | 8 | 88.9 |
| 3-(3-Chloro-4-dimethylamino-phenyl)-4,9-dihydronaphtho-[2,3-d]isoxazole-4,9-dione | '' | 250 | 10 | 1 | 10.0 |
| 3,5'-Diphenyl-4-oxo-4,9-dihydronaphtho[2,3-d]-isoxazole-9-spiro-2'-1',3',4'-dioxazole | "Miniature" | 50 | 29 | 3 | 10.3 |
| '' | '' | 100 | 30 | 4 | 13.3 |
| '' | '' | 250 | 29 | 4 | 13.8 |
| '' | "Fukuju No. 2" | 50 | 19 | 4 | 21.2 |
| '' | '' | 100 | 20 | 5 | 25.0 |
| '' | '' | 250 | 22 | 13 | 59.0 |
| 3,5'-Diphenyl-4-oxo-4,5-dihydronaphtho[2,1-d]-isoxazole-5-spiro-2'-1',3',4'-dioxazole | "Miniature" | 50 | 20 | 1 | 5.0 |
| '' | '' | 100 | 20 | 2 | 10.0 |
| '' | '' | 250 | 20 | 3 | 15.0 |
| None (control) | '' | — | 30 | 0 | 0 |
| None (control) | "Fukuju No. 2" | — | 30 | 0 | 0 |

Test Methods (1) With "Miniature" tomato: When two or three of the first flower clusters began to flower, their stamens were removed, and the clusters were covered by paper bags to prevent pollination from non-emasculated flowers. The test solution was prepared by dissolving the test compound at a pre-determined concentration in water together with 100 μg/ml of Tween 20. On the day after the removal of stamens, the test solution was sprayed onto the flower clusters. The number of developed fruit was counted after the fruit had colored, and parthenocarpy was confirmed by the fact that the fruit had no seeds.

(2) With "Fukuju No.2" tomato: When two or three of the first flower clusters began to flower, their stamens and stigmas were removed. Then the flowers were soaked in test solution prepared in the same manner as described above. The number of developed fruit was counted after the fruit had colored, and parthenocarpy was confirmed by the fact that the fruit had no seeds.

It is apparent from the table that the test compounds have marked parthenocarpy-stimulating activity. In addition, it has been confirmed that they show no phytotoxicity against the test plant and that the fruit harvested is not inferior to those obtained by natural pollination either in size or in weight.

Since the other quinone derivatives of the present invention not listed in the table also show similar biological activity, all the quinone derivatives [I] and [II] are extremely useful as parthenocarpy-stimulating agents.

The plant growth regulating compositions of the present invention may be prepared in various conventional forms such as aerosols, solutions, emulsions, emulsifiable concentrates, wettable powders, pastes, dusts, granules, pellets, tablets or the like according to the use intended. The composition may normally contain from about 0.00001 percent by weight to about 90 percent by weight of the quinone derivative [I] or [II] as an active ingredient, the amount contained depending on the form of composition as well as the use intended. To formulate the composition, suitable gaseous, liquid, or solid carriers and other ingredients including surface active agents are used in addition to one or more compounds of the quinone derivatives [I] or [II], and conventional techniques for mixing, blending, crushing, granulating, or tabletting may optionally be adopted.

The surface active agents used in preparing the compositions of the present invention can be wetting, dispersing, or emulsifying agents. They may act, for example, as wetting agents for wettable powders and dusts, as despersing agents for wettable powders and suspensions, and as emulsifying agents for emulsions and emulsifiable concentrates. Surfactants may also enhance the biological activity of the active ingredients.

Suitable surface active agents for use in the composition include polyethylene glycol esters with fatty acids; polyethylene glycol ethers with alkylphenols or with long-chain aliphatic alcohols; polyethylene glycol ethers with sorbitan fatty acid esters; and polyoxyethylenethio ethers. Other suitable surfactants include ammonium, alkali, or alkaline earth salts of alkylaryl sulfonic acids; ammonium, alkali, or alkaline earth fatty alcohol sulfates; fatty acid esters of ammonium, alkali or alkaline earth isothionates or taurates; ammonium, alkali or alkaline earth salts of lignin sulfonic acids; methylated or hydroxyethylated cellulose; polyvinyl alcohols; alkyl-substituted polyvinyl pyrrolidones; ammonium, alkali, or alkaline earth salts of polymerized alkylnaphthalene sulfonic acids; and long-chain quaternary ammonium compounds.

Examples of gaseous carriers include butane, nitrogen, carbon dioxide, freon, and other inert gases. Liquid carriers for the present composition may be water, or suitable inert organic solvents such as aliphatic hydrocarbons (e.g. pentane, hexane, cyclohexane, petroleum ether, gasoline, kerosene), aromatic hydrocarbons (e.g. benzene, toluene, xylene), halogenated hydrocarbons(e.g methylene chloride, chloroform, carbon tetrachloride, trichloroethane), ketones (e.g. acetone, methyl ethyl ketone), ethers (e.g. ether, isopropyl ether, tetrahydrofuran, dioxane), esters (e.g. ethyl acetate, amyl acetate) or alcohols (e.g. methanol, ethanol, butanol). Solid carriers may be, for example, mineral powders (e.g. clay, talc, kaoline, bentonite, diatomaceous earth, silica gel), vegetable powders (e.g. soybean powder, wheat powder), or other powders conventionally used as agricultural solid carriers or diluents.

More particularly, preferred forms of the composition of the present invention for use as a parthenocarpy-stimulating agent may be solutions, emulsions, emulsifiable concentrates or wettable powders. They may be diluted before application to a concentration of from about 1 $\mu$g/ml to about 1,000 $\mu$g/ml and sprayed on the objective plants at a stage of flowering. To ensure such effect, it may be recommended to repeat the treatment 2 or 3 times in the same day or over 2 or 3 days, though the full effect can usually be obtained by a single treatment.

If desired, the compositions of the present invention may contain, in addition to one or more of the quinone derivatives [I] or [II], other plant-regulants, plant hormones, germicides, pesticides, insecticides, acaricides, nematocides, fertilizers or the like.

The following examples are given solely for the purpose of illustration and not to be construed as limitation of this invention, many variations of which are possible.

EXAMPLE 1

To a solution of 1,4-naphthoquinone (16.6 g) and triethylamine (12.8 g) in benzene (330 ml) is dropwise added another solution of p-methoxybenzhydroxamyl chloride (23.5 g) in ether (150 ml) at 18°–21°C. The reaction mixture is stirred for 20 minutes and refluxed for 1 hour in water bath. After the reaction, to the mixture is added water and extraction with benzene is effected. The extract is dried over sodium sulfate and evaporated. The residue is chromatographed on alumina. The benzene eluate is evaporated, and the residue is recrystallized from ethyl acetate to give 3-(4-methoxyphenyl)-4,9-dihydronaphtho[2,3-d]isoxazole-4,9-dione (1.55 g, m.p. 204°–207°C). Further, recrystallization from ethyl acetate gives crystals melting at 212°–216°C.

Anal. Calcd. for $C_{18}H_{11}NO_4$: C, 70.81; H, 3.63; N, 4.59. Found: C, 70.52; H, 3.68; N, 5.46.

EXAMPLES 2 – 7

The products listed below can be prepared by substantially the same procedure as Example 1 from the corresponding starting compounds.

| Ex. No. | Starting Compound | Source of Nitrile Oxide | Product | Properties of Product |
|---|---|---|---|---|
| 2 | 1,4-Naphthoquinone | p-Chlorobenzhydroxamyl chloride | 3-(4-Chlorophenyl)-4,9-dihydronaphtho[2,3-d]isoxazole-4,9-dione | m.p. 178–178.5°C. Yellow needles. Anal. Calcd. for $C_{17}H_8O_3NCl$: C, 65.92; H, 2.28; N, 4.52. Found: C, 66.03; H, 2.61; N, 4.36. |
| 3 | 1,4-Naphthoquinone | 3-Pyridylcarbohydroxamyl chloride hydrochloride | 3-(3-Pyridyl)-4,9-dihydronaphtho[2,3-d]isoxazole-4,9-dione | m.p. 187–190°C. Yellow needles. Anal. Calcd. for $C_{16}H_8O_3N_2$: C, 69.56; H, 2.92; N, 10.14. Found: C, 69.74; H, 2.72; N, 10.43. |
|  | 6,7-Dimethyl-1,4-p-Methylbenzhydrox- | 3-(4-Methylphenyl)- |  | m.p. 213–214°C. Yellow needles. |

—Continued

| Ex. No. | Starting Compound | Source of Nitrile Oxide | Product | Properties of Product |
|---|---|---|---|---|
| 4 | naphthoquinone | amyl chloride | 6,7-dimethyl-4,9-dihydronaphtho[2,3-d]isoxazole-4,9-dione | Anal. Calcd. for $C_{20}H_{15}O_3N$: C, 75.69; H, 4.76; N, 4.41. Found: C, 75.65; H, 4.73; N, 4.48. |
| 5 | 6,7-Dimethyl-1,4-naphthoquinone | p-Chlorobenzhydroxamyl chloride | 3-(4-Chlorophenyl)-6,7-dimethyl-4,9-dihydronaphtho[2,3-d]-isoxazole-4,9-dione | m.p. 213–220°C. Yellow needles. Anal. Calcd. for $C_{19}H_{12}O_3NCl$: C, 67.57; H, 3.58; N, 4.15. Found: C, 67.69; H, 3.59; N, 4.22. |
| 6 | 6,7-Dimethyl-1,4-naphthoquinone | 2,4-Dichlorobenz-hydroxamyl chloride | 3-(2,4-Dichlorophenyl)-6,7-dimethyl-4,9-dihydronaphtho[2,3-d]isoxazole-4,9-dione | m.p. 192–194°C. Yellow needles. Anal. Calcd. for $C_{19}H_{11}O_3NCl_2$: C, 61.31; H, 2.98; N, 3.76. Found: C, 61.17; H, 2.98; N, 3.76. |
| 7 | 1,4-Naphthoquinone | 3-Chloro-4-dimethylaminobenzhydroxamyl chloride | 3-(3-chloro-4-dimethylaminophenyl)-4,9-dihydronaphtho[2,3-d]isoxazole-4,9-dione | m.p. 168–172°C. Dark violet needles. Anal. Calcd. for $C_{19}H_{13}O_3N_2Cl$: C, 64.69; H, 3.71; N, 7.94. Found: C, 64.92; H, 3.73; N, 8.13 |

EXAMPLE 8

To a solution of 1,4-naphthoquinone (4.4 g), triethylamine (3.36 g) and chloranile (3.45 g) in benzene (176 ml) is added p-methylbenzhydroxyamyl chloride (which is prepared from p-methylbenzaldehyde oxime (5.0 g), chlorine (3.58 g) and ether (150 ml).) and the mixture is refluxed for 2 hours. After addition of water, the reaction mixture is extracted with benzene. The benzene extract is washed with water, dried and evaporated. The residue is washed with benzene, and insoluble substance is filtered off. The filtrate is chromatographed on alumina and eluted with benzene and with methylene chloride. The eluates are combined, evaporated, and the residue is recrystallized from ethyl acetate-isopropyl ether to give 3-(4-methylphenyl)-4,9-dihydronaphtho[2,3-d]isoxazole-4,9-dione (1.902 g) as pale yellow needles, m.p. 138°–146°C.

Anal. Calcd. for $C_{18}H_{11}O_3N$: C, 74.73; H, 3.83; N, 4.84. Found: C, 74.54; H, 3.77; N, 4.83.

EXAMPLE 9

To a solution of 6,7-dimethoxy-1,4-naphthoquinone (880 mg), triethylamine (490 mg) and chloranile (500 mg) in benzene (70 ml) is added another solution of benzhydroxamyl chloride (50 mg) in ether (5 ml) and the mixture is refluxed for 1 hour. The reaction mixture is treated by the same procedure as Example 8 to give 3-phenyl-6,7-dimethoxy-4,9-dihydronaphtho[2,3-d]isoxazole-4,9-dione (413 mg). Recrystallization from benzene gives orange crystals melting at 242°–244°C.

Anal. Calcd. for $C_{19}H_{13}O_5N$: C, 68.06; H, 3.91; N, 4.18. Found: C, 68.28; H, 4.10; N, 4.10.

EXAMPLE 10

To a solution of a quinoline-5,8-quinone (2.5 g), triethylamine (4.8 g) in benzene (40 ml) is added 3-pyridine-carbonhydroxamyl chloride (3.4 g) with stirring and the mixture is refluxed for 2 hours. After addition of water, the reaction mixture is extracted with chloroform. The extract is dried over sodium sulfate and evaporated. The residue is chromatographed on alumina and eluted with benzene-methylene chloride (1:2). The eluate is evaporated and the residue is washed with a mixture of methylene chloride-isopropyl ether and precipitate is collected by filtration. Recrystallization from ethyl acetate gives quinoline-5,8-quinone condensed with two moles of pyridinenitrile oxide (95 mg) as colorless plates (m.p. 218°–222°C). The crystals are supposed to be one of the following four isomers:

1. 3,5'-di-(3-pyridyl)-4-oxo-4,9-dihydroisoxazolo[4,5-g]quinoline-9-spiro-2'-1',3',4'-dioxazole
2. 3,5'-di-(3-pyridyl)-4-oxo-4,9-dihydroisoxazolo[5,4-g]quinoline-9-spiro-2'-1',3',4'-dioxazole
3. 3,5'-di-(3-pyridyl)-9-oxo-4,9-dihydroisoxazolo[4,5-g]quinoline-4-spiro-2'-1',3',4'-dioxazole
4. 3,5'-di-(3-pyridyl)-9-oxo-4,9-dihydroisoxazolo[5,4-g]quinoline-4-spiro-2'-1',3',4'-dioxazole Anal. Calcd. for $C_{21}H_{11}O_4N_5$: C, 63.47; H, 2.80; N, 17.63. Found: C, 63.38; H, 3.02; N, 17.23.

The eluates of benzene-methylene chloride (1:2) to methylene chloride are combined, evaporated, and the residue is washed with isopropyl ether to precipitate 3-(3-pyridyl)-4,9-dihydroisoxazolo[4,5 or 5,4-g]quinoline-4,9-dione (360 mg). Recrystallization from ethyl acetate gives pale yellowish green needles melting at 206°–209°C.

Anal. Calcd. for $C_{15}H_{17}O_3N_3$: C, 64.98; H, 2.54; N, 15.16. Found: C, 65.13; H, 2.68; N, 15.22.

EXAMPLE 11

To a solution of quinoline-5,8-quinone (795 mg), triethylamine (606 mg) in benzene (80 ml) is gradually added benzhydroxamyl chloride (856 mg) at about 15°C with stirring and the mixture is refluxed for 1 hour. To the reaction mixture is added water and ether and the resinoid substance is removed by filtration. The filtrate is extracted with ether. The extracts are combined, washed with water, dried over sodium sulfate and evaporated. The residue is washed with methylene chloride to give 3-phenyl-4,9-dihydroisoxazolo[4,5 or 5,4-g]-quinoline-4,9-dione as yellow crystals. Recrystallization from ethyl acetate gives the product melting at 193°–196°C.

Anal. Calcd. for $C_{16}H_8O_3N_2$: C, 69.56; H, 2.92; N, 10.14. Found: C, 69.33; H, 2.74; H, 10.15.

The methylene chloride washing and the ethyl acetate mother liquid of recrystallization are combined, chromatographed on alumina and eluted with benzene. The benzene eluate is evaporated to give residue. Recrystallization from ethyl acetate gives two kinds of addition products; one melts at 208°–210°C (163 mg) and another does at 200°–211°C (91 mg). These products are supposed to be two of the following isomers.
1. 3,5'-diphenyl-4-oxo-4,9-dihydroisoxazolo[4,5-g]quinoline-9-spiro-2'-1',3',4'-dioxazole
2. 3,5'-diphenyl-4-oxo-4,9-dihydroisoxazolo[5,4-g]quinoline-9-spiro-2'-1',3',4'-dioxazole
3. 3,5'-diphenyl-9-oxo-4,9-dihydroisoxazolo[4,5-g]quinoline-4-spiro-2'-1',3',4'-dioxazole
4. 3,5'-diphenyl-9-oxo-4,9-dihydroisoxazolo[5,4-g]quinoline-4-spiro-2'-1',3',4'-dioxazole Anal. Calcd. for $C_{23}H_{13}O_4N_3$: C, 69.87; H, 3.31; N, 10.63. Found: C, 69.64; H, 3.20; N, 10.41.

EXAMPLE 12

An emulsifiable concentrate of the following composition is prepared:

| | |
|---|---|
| 3-Phenyl-4,9-dihydronaphtho[2,3-d]isoxazole-4,9-dione | 10% by weight |
| Polyethylene alkylaryl ether | 4% by weight |
| Acetone | 86% by weight |

The emulsifiable concentrate is diluted 200- to 1,000-fold with water before application for parthenocarpy stimulation.

EXAMPLE 13

An emulsifiable concentrate of the same composition as Example 12 is prepared except that 3-methyl-4,5-dihydronaphtho[2,1-d]isoxazole-4,5-dione is used in lieu of 3-phenyl-4,9-dihydronaphtho[2,3-d]isoxazole-4,9-dione.

The emulsifiable concentrate is diluted to 100- to 500-fold with water before application for parthenocarpy stimulation.

EXAMPLE 14

An emulsifiable concentrate of the following composition is prepared:

| | |
|---|---|
| 3,5'-Diphenyl-4-oxo-4,9-dihydronaphtho[2,3-d]-isoxazole-9-spiro-2'-1',3',4'-dioxazole | 10% by weight |
| Polyoxyethylene alkylaryl ether | 10% by weight |
| Methylnaphthalene | 80% by weight |

The emulsifiable concentrate is diluted 200- to 10,000-fold with water before application for parthenocarpy stimulation.

EXAMPLE 15

An emulsifiable concentrate of the same composition as Example 14 is prepared except that 3,5'-diphenyl-4-oxo-4,5-dihydronaphtho[2,1-d]isoxazole-5-spiro-2'-1',3',4'-dioxazole is used in lieu of 3,5'-diphenyl-4-oxo-4,9-dihydronaphtho[2,3-d]isoxazole-9-spiro-2'-1',3',4'-dioxazole.

The emulsifiable concentrate is diluted 100- to 500-fold with water before application for parthenocarpy stimulation.

EXAMPLE 16

An emulsifiable concentrate of the following composition is prepared:

| | |
|---|---|
| 3-(3-Pyridyl)-4,9-dihydronaphtho[2,3-d]isoxazole-4,9-dione | 10% by weight |
| Alkylphenyl ethyleneoxide | 1% by weight |
| Acetone | 50% by weight |
| Benzene | 39% by weight |

The emulsifiable concentrate is diluted 200- to 10,000-fold with water before application.

EXAMPLE 17

An emulsifiable concentrate of the following composition is prepared:

| | |
|---|---|
| 3,5'-Diphenyl-4-oxo-9-iodo-4,5-dihydroisoxazolo[5,4-f]isoquinoline-5-spiro-2'-1',3',4'-dioxazole | 10% by weight |
| Alkylphenyl ethyleneoxide | 5% by weight |
| Acetone | 50% by weight |
| Benzene | 35% by weight |

The emulsifiable concentrate is diluted 100- to 500-fold with water before application.

EXAMPLE 18

A dust of the following composition is prepared:

| | |
|---|---|
| 3-(4-Methoxyphenyl)-4,9-dihydronaphtho[2,3-d]-isoxazole-4,9-dione | 1 part by weight |
| A mixture of talc and kaoline | 20 parts by weight |

The mixture is blended and ground to obtain a dust.

EXAMPLE 19

A dust of the same composition as Example 18 is prepared except 3,5'-di-(3-pyridyl)-4-oxo-9-bromo-4,5-dihydroisoxazolo[5,4-f]isoquinoline-5-spiro-2'-1',3',4'-dioxazole is used in lieu of 3-(4-methoxyphenyl)-4,9-dihydronaphtho[2,3-d]isoxazole-4,9-dione.

EXAMPLE 20

A mixture of the following composition is prepared:

| | |
|---|---|
| 3-(4-Chlorophenyl)-4,9-dihydronaphtho[2,3-d]isoxazole-4,9-dione | 20% by weight |
| Bentonite powder | 80% by weight |

After blending, the mixture is kneaded with water, granulated, and dried to obtain granules.

EXAMPLE 21

A mixture of the same composition as Example 20 is prepared except 3-phenyl-4,5-dihydronaphtho[2,1-d]isoxazole-4,5-dione is used in lieu of 3-(4-chlorophenyl)-4,9-dihydronaphtho[2,3-d]isoxazole-4,9-dione.

After blending, the mixture is kneaded with water, granulated, and dried to obtain granules.

What is claimed is:

1. A method for stimulating parthenocarpy in fruit bearing plants which comprises applying to said plants at the stage of flowering a parthenocarpy stimulating amount of a composition comprising as an active ingredient a compound selected from the group consisting of:

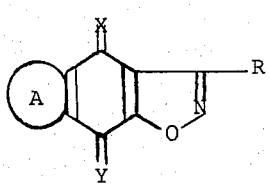

and

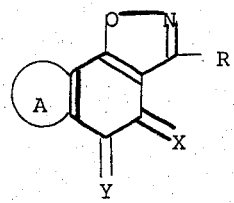

wherein
R is a member selected from the group consisting of halogen, lower alkyl, phenyl, lower alkyl phenyl, di-(lower alkyl)-phenyl, lower alkoxy phenyl, di-(lower alkoxy)-phenyl, hydroxyphenyl, halogenophenyl, dihalogenophenyl [di-(lower alkyl)-amino]-phenyl and halogeno-[di-(lower alkyl)-amino]-phenyl;
X and Y each are oxygen and
A is a condensed aromatic ring selected from the group consisting of benzene, lower alkylbenzene, di-(lower alkyl)-benzene, lower alkoxybenzene, di-(lower alkoxy)-benzene, hydroxybenzene, halogenobenzene and didhalogenobenzene.

2. A method according to claim 1, wherein the halogen or halogeno moiety is selected from the group consisting of chlorine, bromine, iodine and fluorine.

3. A method according to claim 1, wherein the active ingredient is 3-phenyl-4,9-dihydronaphtho[2,3-d]isoxazole-4,9-dione.

4. A method according to claim 1, wherein the active ingredient is 3-(3-chloro-4-dimethylaminophenyl)-4,9-dihydronaphtho[2,3-d]isoxazole-4,9-dione.

5. A method according to claim 1, wherein the active ingredient is 3-phenyl-4,5-dihydronaphtho[2,1-d]isoxazole-4,5-dione.

6. A method according to claim 1, wherein the active ingredient is 3-(4-methoxyphenyl)-4,9-dihydronaphtho[2,3-d]isoxazole-4,9-dione.

7. A method according to claim 1, wherein the active ingredient is 3-(4-chlorophenyl)-4,9-dihydronaphtho[2,3-d]isoxazole-4,9-dione.

8. A method according to claim 1, wherein the active ingredient is 3-methyl-4,5-dihydronaphtho[2,1-d]isoxazole-4,5-dione.

9. A method according to claim 1 wherein the composition is in the form of a solution.

10. A method according to claim 1 wherein the composition is in the form of an emulsion.

11. A method according to claim 1 wherein the composition is in the form of an emulsifiable concentrate.

12. A method according to claim 1 wherein the composition is in the form of a wettable powder.

* * * * *